No. 679,143. Patented July 23, 1901.
W. H. FORD.
MILLING TOOL.
(Application filed Oct. 19, 1900.)
(No Model.)
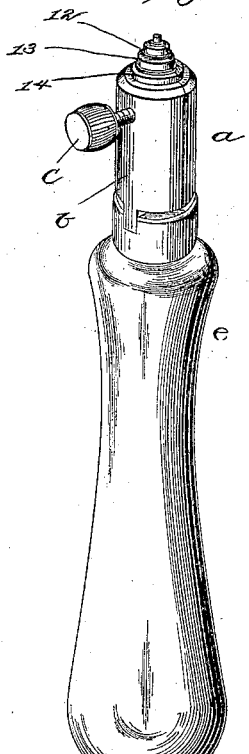
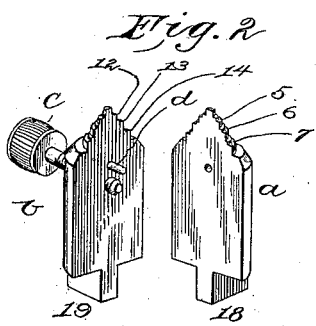
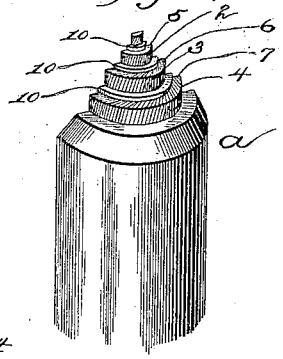
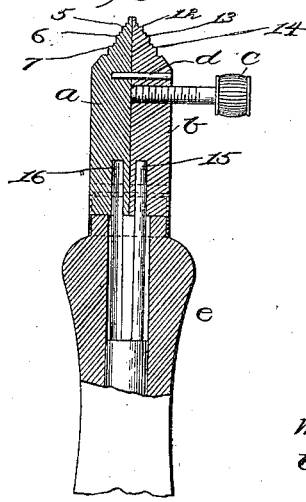
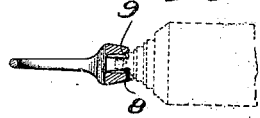
Witnesses,
W. C. Lunsford.
Fred S. Greenleaf.
Inventor.
William H. Ford
by Crosby & Gregory
Attys.

UNITED STATES PATENT OFFICE.

WILLIAM H. FORD, OF LOWELL, MASSACHUSETTS, ASSIGNOR TO RINGSET COMPANY, OF BOSTON, MASSACHUSETTS.

MILLING-TOOL.

SPECIFICATION forming part of Letters Patent No. 679,143, dated July 23, 1901.

Application filed October 19, 1900. Serial No. 33,647. (No model.)

*To all whom it may concern:*

Be it known that I, WILLIAM H. FORD, a citizen of the United States, residing at Lowell, in the county of Essex and State of Massachusetts, have invented an Improvement in Milling-Tools, of which the following description, in connection with the accompanying drawings, is a specification, like characters on the drawings representing like parts.

In the production of finger-rings and jewelry adapted to display diamonds or other stones seats have to be cut to receive and retain the stone. Usually the ring or other article in which the stone is to be displayed presents a series of prongs the inner sides of which must be cut or notched to receive and hold the stone to be used.

The tool herein to be described has been devised to cut the seats for stones.

The tool shown presents an arc-shaped cutter and a burnisher or guide, said parts being movable away one from the other to adapt it to cut the seat of the required diameter and burnish the same.

Figure 1 in elevation shows a tool embodying my invention. Fig. 2 shows the parts of the active end of the tool detached from the handle and separated. Fig. 3 is an enlarged detail of the cutting member or file part of the tool. Fig. 4 is a partial longitudinal section of the tool, and Fig. 5 shows part of a ring in section with a seat cut therein.

My novel tool is represented as composed of a plurality of parts, one of which, as $a$, is provided with suitable teeth to be described, by which to cut away the metal in the formation of a seat for the stone, the other part $b$, by acting against the inner sides of the prongs, burnishing the same after the action of the cutter $a$. The cutter member $a$, as shown, is provided with a plurality of cutting-faces 1, 2, 3, and 4, occupying arcs of circles of different diameters, to thereby adapt the tool to cut the side walls of the stone-seats and adapt them to the diameter of the stone to be set. Each face 1, 2, 3, and 4 is terminated by a toothed end or portion, as 5 6 7, which is adapted to cut or form the bottom of the seat.

Fig. 5 shows in section part of a ring having a cut-seat for a stone. The side walls 8 of the seat are cut by one or the other face 2, 3, or 4, while the bottom 9 is cut by one of the ends 5, 6, or 7. Each cutter has a flange, as 10, extended from it, which acts as a stop to determine the depth of the cut in the side walls, said flanges contacting with the tops of the prongs when the cutter should cease to act. The member $b$ is shown as of the same shape as the member $a$, and the smooth faces 12, 13, 14, and $14^\times$, acting against the interior of the cavity in which the seat is being cut by the member $a$, burnishes the cut surface.

To enable the tool to be expanded for and while cutting the seat or seats, I have provided one member, as $b$, with an adjusting device $c$, shown as a screw having a milled head, and preferably the same member has a guiding device $d$, shown as a pin entering loosely a hole in the member $a$. Each member $a$ and $b$ has a hole in its end, (see Fig. 4,) in which is entered a yielding support 15 or 16, shown as pins sustained by a handle $e$, and each member is shown as provided with a projection, as 18 19, to enter guideways cut in the handle.

The tool is entered into the space or between the prongs to be provided with the seat, the inner side of each prong presenting a thin straight edge, and the tool will then be turned to insure the proper pressure of the cutting-faces on the material to be cut, and thereafter the tool may be rotated back and forth until the seats have been cut and burnished to the proper depth.

This invention is not limited to making the tool of the exact shape shown, as I believe I am the first to make an expansible tool of the class described or to make a tool adapted to cut seats of different diameters.

Having described my invention, what I claim, and desire to secure by Letters Patent, is—

1. A milling-tool composed of multiparts, one having a convexed cutting edge, and the other a burnishing-surface.

2. A milling-tool composed of multiparts, one part acting to cut metal, and the other to burnish the cut portion, and means to move one of said parts laterally away from the other.

3. A milling-tool composed of multiparts, one of said parts having a plurality of convexed cutting edges and the other having a plurality of burnishing-surfaces.

4. A milling-tool having an edge to make a circular cut, an end to cut a seat or shoulder to meet the circular cut, and a burnishing-surface to burnish the cut parts.

5. A milling-tool having an arc-shaped cutting edge provided with a series of file-like teeth to make a circular cut, and a face extended therefrom to limit the extent of the cut made by said edge.

6. A milling-tool composed of two parts, one to act as a cutter, and the other as a burnisher, combined with a spring to sustain yieldingly one of said parts, and means to provide for placing the said parts at the desired distance apart according to the size of the holes to be provided with seats or notches.

7. A milling device segmental in cross-section and presenting an arc-shaped cutting edge, a stop to determine the depth of cut made by said edge, the entering end of the arc-shaped cutting edge having teeth to determine the shape of the cut at its inner end.

8. A milling device presenting a series of cutting edges, arc-shaped in cross-section, each cutting edge having extended from it a flange to act as a stop to determine the extent of the cut made by the edge from which it projects.

In testimony whereof I have signed my name to this specification in the presence of two subscribing witnesses.

WILLIAM H. FORD.

Witnesses:
GEO. W. GREGORY,
EDITH M. STODDARD.